(12) United States Patent
Strashny (10) Patent No.: US 12,552,259 B2
(45) Date of Patent: Feb. 17, 2026

(54) ELECTROMECHANICAL JOINT FOR CONDUCTOR ARM HAVING MULTIPLE DEGREES OF FREEDOM

(71) Applicant: Caterpillar Global Mining Equipment LLC, Denison, TX (US)

(72) Inventor: Igor Strashny, Tucson, AZ (US)

(73) Assignee: Caterpillar Global Mining Equipment LLC., Denison, TX (US)

( * ) Notice: Subject to any disclaimer, the term of this patent is extended or adjusted under 35 U.S.C. 154(b) by 893 days.

(21) Appl. No.: 17/829,615

(22) Filed: Jun. 1, 2022

(65) Prior Publication Data

US 2023/0391202 A1    Dec. 7, 2023

(51) Int. Cl.
*B60L 5/38*     (2006.01)
*B60L 5/28*     (2006.01)
*B60L 5/36*     (2006.01)

(52) U.S. Cl.
CPC .............. *B60L 5/38* (2013.01); *B60L 5/28* (2013.01); *B60L 5/36* (2013.01); *B60L 2200/40* (2013.01)

(58) Field of Classification Search
CPC ...... B60L 5/38; B60L 5/36; B60L 5/28; B60L 2200/40; B60L 5/08; B60L 5/16; H01R 2201/26
See application file for complete search history.

(56) References Cited

U.S. PATENT DOCUMENTS

| | | | | |
|---|---|---|---|---|
| 430,580 A * | 6/1890 | Hunter | ...................... | B60L 5/16 191/69 |
| 4,634,889 A | 1/1987 | Foggia et al. | | |
| 9,130,330 B2 * | 9/2015 | Menardo | .............. | H01R 39/646 |
| 11,035,348 B2 * | 6/2021 | Marica | ...................... | F04B 1/14 |
| 2017/0166084 A1 * | 6/2017 | Tajima | .................... | B60L 53/35 |
| 2019/0263266 A1 * | 8/2019 | Algret | ...................... | B60M 1/34 |

FOREIGN PATENT DOCUMENTS

| | | |
|---|---|---|
| CN | 208149088 U | 11/2018 |
| CN | 109514595 A | 3/2019 |
| CN | 109514596 A | 3/2019 |

(Continued)

OTHER PUBLICATIONS

Written Opinion and International Search Report for Int'l. Patent Appln. No. PCT/US2023/021808, mailed Aug. 16, 2023 (9 pgs).

*Primary Examiner* — Cheng Lin
(74) *Attorney, Agent, or Firm* — Lee & Hayes, PLLC (57) ABSTRACT

An electromechanical joint provides rotational movement in at least two dimensions while conducting electrical power between orthogonal hubs. The joint, shaped as a cross, has four conical shafts positioned orthogonally and apart from each other within an interior of a housing. Apexes of the conical shafts face each other proximate a centroid of the housing. A conductive fluid, such as Galinstan, fills recesses between the conical shafts. Separate yokes attached to pairs of the hubs may impart forces on the shafts, causing the shafts to rotate within the conductive fluid around orthogonal axes. The conductive fluid provides simultaneous conduction of electrical power between the hubs. The yokes may be affixed respectively to a current collector and conductive arms of a work machine for improved movement and power conduction without the need for additional components.

20 Claims, 7 Drawing Sheets

(56) References Cited

FOREIGN PATENT DOCUMENTS

| | | | | |
|---|---|---|---|---|
| CN | 109514597 A | * | 3/2019 | .............. B25J 17/00 |
| CN | 113028236 A | | 6/2021 | |
| DE | 102008031588 A1 | * | 1/2010 | ............. H01R 4/187 |
| EP | 0670433 B1 | | 12/1999 | |
| KR | 20220007624 A | | 1/2022 | |
| WO | WO-2016020302 A1 | * | 2/2016 | ................ B60L 5/16 |
| WO | 2016127775 A1 | | 8/2016 | |
| WO | 2020046866 A1 | | 3/2020 | |
| WO | WO-2020222640 A1 | * | 11/2020 | .......... B25J 17/0216 |
| WO | WO-2021121620 A1 | * | 6/2021 | ................ B60L 5/08 |

* cited by examiner

Couple an electrically conductive assembly to a source of electrical power, the assembly including an electromechanical joint between a first conductive yoke and a second conductive yoke, the electromechanical joint including a first conductive shaft along a first longitudinal axis and a second conductive shaft along a second longitudinal axis
702

Conduct the electrical power through the first conductive shaft, conductive fluid, and the second conductive shaft
704

In response to a first force on a second conductive yoke substantially perpendicular to a first longitudinal axis, pivot the second conductive shaft about the first longitudinal axis
706

In response to a second force on the second conductive yoke substantially perpendicular to a second longitudinal axis, rotate the second conductive shaft about the second longitudinal axis
708

Continue to conduct the electrical power through the first conductive shaft, the conductive fluid, and the second conductive shaft during the one or more of the pivoting the second conductive shaft and the rotating the second conductive shaft.
710

*FIG. 7*

ELECTROMECHANICAL JOINT FOR CONDUCTOR ARM HAVING MULTIPLE DEGREES OF FREEDOM

TECHNICAL FIELD

The present disclosure relates to an electromechanical joint for a conductor arm having multiple degrees of freedom. More specifically, the present disclosure relates to a mechanical joint rotatable around multiple axes while conducting electrical power at high voltage, and to a method for operating the joint between a conductor arm and a sliding current collector of a work machine.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but the use of machines powered by diesel engines may not be appropriate in certain environments. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

A power rail based on the ground may provide electrical power to traveling vehicles such as heavy work machines. In some environments, such as with trains or subways that travel on a fixed track, precise alignment between the fixed track and the power rail can ensure reliable delivery of electrical power to a current collector as the vehicle moves. For a heavy work machine that is freely steerable, however, establishing and maintaining an electrical connection between a current collector attached to an extended arm and the power rail can be particularly challenging. The rails may be slightly uneven, twisted, or curved, possibly leading to disconnections or arcing. Arcing can degrade current flow and damage components.

In some environments, such as a mining site, the terrain can also interfere with continuous connection with power rails for a freely steerable work machine along a haul route. The haul route may be uneven, hilly, and pocked, which can lead to steering deviations that could also cause arcing at the current collector. These variations in terrain, as well as steering deviations for the heavy work machine, can also cause the machine to disconnect from the rail, detracting from the value of rail-based delivery of electrical power. While increasing adhesion between the current collector and the rail may decrease disconnections, increased adhesion at the current collector leads to unwanted drag on the arm of the work machine and accelerates wear on the current collector.

One approach for accommodating changes in position between a traveling vehicle and a power rail while maintaining electrical connection between the rail and the vehicle is described in U.S. Patent App. Pub. No. 2019/0263266A1 ("the '266 application"). The '266 application describes a wheeled enclosure that is trailed behind or under an electric vehicle while engaging with an electrical supply rail located in conduits in the road surface. Various mechanisms may be used for mechanically connecting the wheeled enclosure to the vehicle, including a connection bar with rotational joints, a vertical arm with a pivoting or rotational joint at one end and a universal joint at the other end, and vertical bar with a torsional joint. In one embodiment, the '266 application describes a mechanical connection formed from three parallel linkage arms each having ball or universal joints at their ends to permit movement of the vehicle relative to the enclosure. The '266 application, however, does not address the consolidation of electrical and mechanical interfaces into a unified structure. Instead, the wheeled enclosure of the '266 application conducts electrical power obtained from the underground power rail to the vehicle through a separate power cable. As a result, the system of the '266 application is insufficient for freely steerable vehicles having current collectors sliding over a power rail in which drag on the current collectors can adversely affect electrical performance.

Examples of the present disclosure are directed to overcoming deficiencies of such systems.

SUMMARY

In an aspect of the present disclosure, an electromechanical joint includes a housing having an enclosed interior, a first conductive shaft extending into the enclosed interior along a first longitudinal axis, and a second conductive shaft, separated from the first conductive shaft. The second conductive shaft extends into the enclosed interior along a second longitudinal axis different from the first longitudinal axis. In addition, the second conductive shaft is rotatable about the second longitudinal axis and pivotable about the first longitudinal axis. The electromechanical joint includes conductive fluid within the enclosed interior between the first conductive shaft and the second conductive shaft.

In another aspect of the present disclosure, a work machine includes an electric engine, traction devices configured to cause movement of the work machine along a haul route when powered by the electric engine, and a current collector configured to movably engage with at least one power rail disposed proximate the haul route. The work machine includes at least one conductive arm having an upper end and a lower end, and an electromechanical joint disposed between the current collector and the at least one conductive arm. The electromechanical joint includes an enclosure, a first axle having a first shaft and a second shaft and a second axle having a third shaft and a fourth shaft. The first shaft and the second shaft are aligned longitudinally on a first axis passing through the enclosure, while the third shaft and the fourth shaft are aligned longitudinally on a second axis passing through the enclosure substantially orthogonal to the first axis. The first shaft, the second shaft, the third shaft, and the fourth shaft are spaced apart from each other by a separation, and a conductive fluid within the separation contacts the first axle and the second axle.

In yet another aspect of the present disclosure, a method includes coupling an electrically conductive assembly to a source of electrical power, where the electrically conductive assembly includes an electromechanical joint between a first conductive yoke and a second conductive yoke and the electromechanical joint includes a first conductive shaft and a second conductive shaft. The first conductive shaft is coupled to the first conductive yoke and extends along a first longitudinal axis, while the second conductive shaft is coupled to the second conductive yoke and extends along a second longitudinal axis different from the first longitudinal axis. The second conductive shaft is separated from the first conductive shaft, and conductive fluid is between the first conductive shaft and the second conductive shaft. The method includes conducting the electrical power through the first conductive shaft, the conductive fluid, and the second conductive shaft, and, in response to a first force on the second conductive yoke substantially perpendicular to the first longitudinal axis, pivoting the second conductive shaft about the first longitudinal axis. Additionally, in response to a second force on the second conductive yoke substantially perpendicular to the second longitudinal axis, the second conductive shaft is rotated about the second longitudinal axis. The method includes continuing to conduct the electrical power through the first conductive shaft, the conductive fluid, and the second conductive shaft during the one or more of the pivoting the second conductive shaft and the rotating the second conductive shaft.

DETAILED DESCRIPTION

Figure 1:
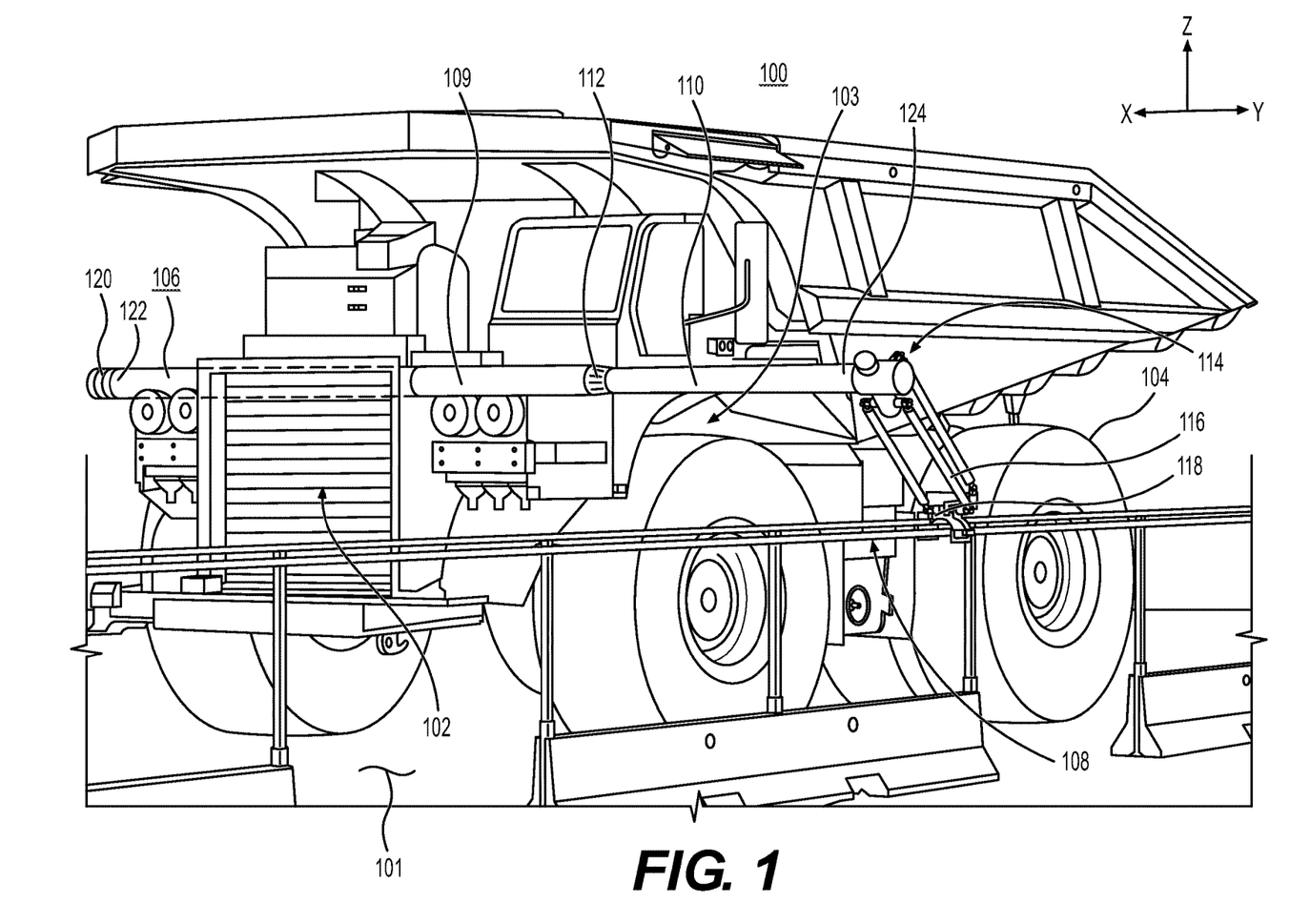
FIG. 1 is an isometric view of an electrically powered work machine coupled to a roadside power source in accordance with an example of the present disclosure.

Wherever possible, the same reference numbers will be used throughout the drawings to refer to same or like parts. Multiple instances of like parts within a figure may be distinguished using a letter suffix. FIG. 1 illustrates an isometric view of a work machine 100 within an XYZ coordinate system as one example suitable for carrying out the principles discussed in the present disclosure. Exemplary work machine 100 travels along a defined path or roadway, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along roads to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels along a defined path or roadway, also termed haul route 101, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any movable machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. A primary example of mechanical energy provided by electric engine 102 is propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 includes one or more beams of metal arranged substantially parallel to and at a distance above the ground. Support mechanisms hold power rail 108 in place along a distance at the side of a haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 (along the Y axis) as work machine 100 travels in the direction of the X axis, power rail 108 may be installed to the right of work machine 100 (along the —Y axis) or in other locations suitable to the particular implementation. In many examples, such as within a mining site, power rail 108 will not be configured continuously at a fixed distance along a side of haul route 101 and at a fixed height above the ground due, at least in part, to the variation of the terrain.

Therefore, it is expected that the vertical, horizontal, and angular positions of the surface of power rail 108 in the XYZ planes will vary along haul route 101.

Power rail 108 provides a source of electrical power for work machine 100 as either AC or DC voltage. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides a reference voltage of 0 volts, with the two powered conductors providing +1500 VDC and −1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a rigid pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a proximal end near a right side of work machine 100 and a distal end at a left side of work machine 100. Conductor rod 106 may be attached to any convenient location within work machine 100, such as to frame 103, in a manner to enable conductor rod 106 to reach and couple to power rail 108. Shown in FIG. 1 as extending to a left side of work machine 100 toward power rail 108, conductor rod 106 may alternatively be arranged to extend to a right side (along the —Y axis) and at any desired angle from work machine 100 such that conductor rod 106 may be coupled to power rail 108 for obtaining electrical power.

As embodied in FIG. 1, conductor rod 106 includes a cylinder portion 109 mounted to frame 103 of work machine 100. Cylinder portion 109 has a hollow interior and may be a conductive metal having suitable mechanical strength and resiliency, such as aluminum. Within cylinder portion 109, an extension 110 is retained. Extension 110 is slidably engaged within cylinder portion 109 of conductor rod 106 such that it may be extended or retracted axially, i.e., along the Y axis in FIG. 1, to adjust the reach of conductor rod 106. Specifically, in a retracted position, extension 110 is caused to slide within cylinder portion 109 of conductor rod 106 such that a length of conductor rod 106 roughly spans the width of work machine 100. A junction 112 serves as the interface between extension 110 and cylinder portion 109, which is the main body of conductor rod 106. When extension 110 is fully retracted or collapsed into cylinder portion 109, junction 112 essentially becomes the left edge of conductor rod 106. On the other hand, when extension 110 is extended from cylinder portion 109 of conductor rod 106, extension 110 may reach from work machine 100 to above or near power rail 108 on the side of haul route 101.

Within, and possibly including cylinder portion 109, conductor rod 106 has a series of electrical conductors passing longitudinally, i.e. along the Y axis in FIG. 1, at least from a base 122 at a proximal end to a tip 124 at a distal end. Typically, the conductors within conductor rod 106 are formed of a metallic material. Moreover, as with cylinder portion 109, the material for conductors within conductor rod 106 typically have suitable mechanical strength and resiliency to permit their stable extension from work machine 100 to above power rail 108 at the side of haul route 101. In some examples, the conductors are concentric tubes, or hollow cylinders, of solid metal such as aluminum nested together and sized to provide electrical capacity sufficient for powering work machine 100. Tubular conductors within extension 110 slidably engage with corresponding tubular conductors in the portion of conductor rod 106 mounted on work machine 100. This engagement while the tubes slide ensures electrical continuity during extension or retraction of conductor rod 106.

At tip 124 of extension 110 within conductor rod 106, a connector assembly 114 provides an interface to power rail 108 via trailing arms 116 and current collector 118. The arrangement of connector assembly 114, trailing arms 116, and current collector 118 of FIG. 1, which are collectively also referred to as a trailing assembly, are described in further detail in FIG. 2. Power rail 108 is typically arranged along a side of haul route 101, and work machine 100 traverses haul route 101 substantially in parallel with power rail 108. Thus, in reference to FIG. 1, power rails 108 and a travel path for work machine 100 are substantially in parallel with each other and with the X axis. Current collector 118 is configured to maintain an electrical connection with power rail 108 while sliding along its surface in the direction of the X axis as work machine 100 moves. In some examples, trailing arms 116 are conductors coupled to current collector 118, each conducting voltage and current at a different electrical pole for respective conductors within conductor rod 106. In operation, electrical power is accessed from power rail 108 via current collector 118, which remains in contact during movement of work machine 100, and the electrical power is conducted through trailing arms 116 into connector assembly 114.

From connector assembly 114, the electrical power is conveyed at tip 124 through the nested tubular conductors within extension 110 and cylinder portion 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for controls between work machine 100 and conductor rod 106. In some examples, head-end interface 120 includes passageways to control mechanical operation of conductor rod 106, such as for pressurized fluid of a pneumatic or hydraulic control system to extend and retract extension 110 or to control operations within current collector 118 in a manner described further below. In other examples, head-end interface 120 includes passageways for signals to communicate with electronic controls.

Figure 2:
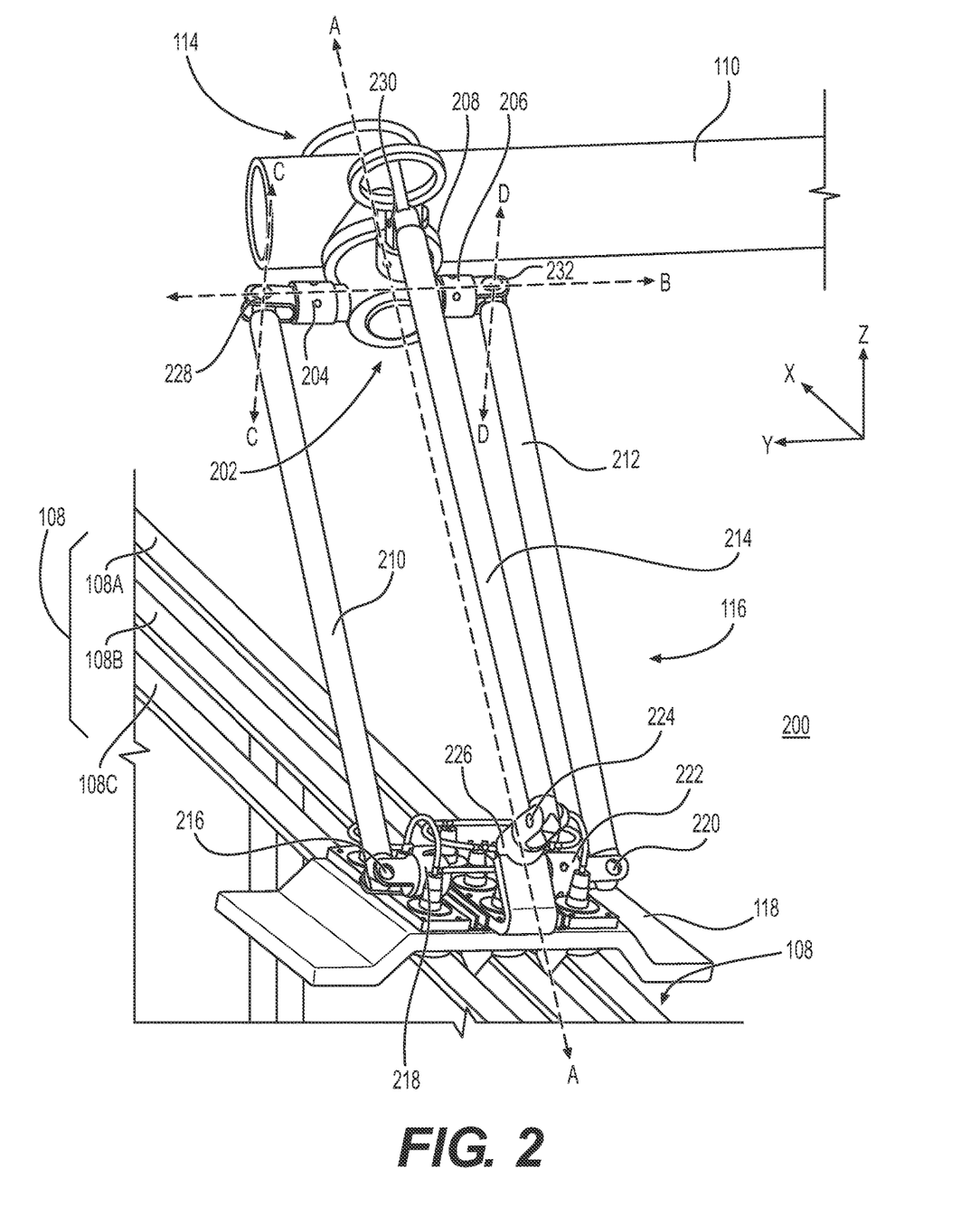
FIG. 2 is a partial isometric rear view of a conductive rod and trailing arms in accordance with an example of the present disclosure.

Connector assembly 114 not only provides electrical connection between the conductors within extension 110 of conductor rod 106 and trailing arms 116, but also accommodates the various changes in relative position between power rail 108 and work machine 100 during travel along haul route 101. Those changes in relative position can include multiple deviations, such as those occurring laterally (work machine 100 and connector assembly 114 moving in the Y axis relative to current collector 118), vertically (work machine 100 and connector assembly 114 moving in the Z axis relative to current collector 118), and angularly (work machine 100 and connector assembly 114 moving in the X-Y plane angularly around the Z axis). One or all of these deviations could occur as a driver steers work machine 100 along haul route 101, work machine 100 responds to an uneven or pocked roadway, or an orientation of power rail 108 varies with respect to work machine 100. FIG. 2 is discussed below and illustrates an example trailing assembly 200 suitable for accommodating multiple deviations in position between work machine 100 and current collector 118.

FIG. 2 is a view from a side of power rail 108 opposite work machine 100 facing generally forward (i.e., along the X axis), which shows a trailing assembly 200 from a back side of extension 110. As shown in the example of FIG. 2, power rail 108 contains three conductors separately identified as inner rail 108A, middle rail 108B, and outer rail 108C, with "inner," "middle," and "outer" describing a respective position relative to work machine 100. As well, in this instance and elsewhere in this disclosure, the suffix "A" denotes a component associated with an electrical path including inner rail 108A, suffix "B" denotes a component associated with an electrical path including middle rail 108B, and suffix "C" denotes a component associated with an electrical path including outer rail 108C. The absence of an "A," "B," or "C" suffix may connote a component discussed generically or collectively in the system without association with a specific power rail.

In one example, two of the conductors in FIG. 2 provide electrical power at different polarities while the third conductor provides a reference of 0 volts. In other examples, the conductors can provide AC voltage at three different polarities or power rail 108 and conductor rod 106 can contain fewer or more than three conductors. Current collector 118, described in more detail below, is electrically coupled to power rail 108 and slides along its surface to maintain an electrical connection with each of inner rail 108A, middle rail 108B, and outer rail 108C. Ultimately, current collector 118 provides the electrical interface between power rail 108 and trailing arms 116.

As shown in FIG. 2, connector assembly 114 within trailing assembly 200 is integrated into extension 110. Although not shown, connector assembly 114 bridges between three conductors within extension 110 and a rotational interface 202, which exits at a bottom portion of extension 110. Rotational interface 202 in turn couples the three conductors within 110 to respective trailing arms 116, namely, outer arm 210, inner arm 212, and middle arm 214, and uses socket and hinge joints to enable ranges of motion for trailing arms 116. As well, rotational interface 202 permits twisting of trailing arms 116 about an axis A-A. Referring to outer arm 210, rotational interface 202 connects to a first conductor (not shown) within extension 110 and includes outer lug 204 arranged generally parallel to the Y axis. A socket joint within outer lug 204 provides rotational movement for outer arm 210 about the axis B-B. In the illustrated example, an outer hinge 228 is coupled to outer lug 204 and further enables outer arm 210 to rotate about an axis C-C, as shown in FIG. 2.

Referring to inner arm 212, rotational interface 202 connects to a second conductor (not shown) within extension 110 and includes an inner lug 206 that provides a rotational movement about axis B-B within a socket joint similar to outer lug 204. As well, inner lug 206 is coupled to an inner hinge 232, which enables inner arm 212 to pivot about an axis D-D, as shown in FIG. 2. A similar socket and hinge arrangement is illustrated in FIG. 2 for coupling middle arm 214 to a third conductor (not shown) within extension 110. In particular, a middle lug 208 exits rotational interface 202 and provides rotational ability of middle arm 214 about a central axis (not labeled) perpendicular to axis B-B. Further, a middle hinge 230 is coupled to middle lug 208 and provides freedom for second arm 214 to pivot about an axis (not shown) parallel to axis B-B. In short, each of trailing arms 116 is coupled to extension 110 via a pivoted and hinged interface that permits movement of the arms with multiple degrees of freedom with respect to extension 110.

At their opposite ends, trailing arms 116 connect via similar configurations with current collector 118 allowing movement of the arms with multiple degrees of freedom with respect to current collector 118. In some examples, the components within 118 associated with trailing arms 116 have axes of rotation parallel to those within connector assembly 114, such as about axes A-A, B-B, C-C, and D-D, but the additional axes within current collector 118 are not shown on FIG. 2 for simplicity. In some examples, for outer rail 108C, outer arm 210 is connected to an outer contactor hinge 216 and an outer contactor lug 218. For inner rail 108A, inner arm 212 is connected to an inner contactor hinge 220 and an inner contactor lug 222. For middle rail 108B, middle arm 214 is connected to a middle contactor hinge 224 and a middle contactor lug 226. The mechanical linkages involving trailing arms 116 are illustrative only and may vary based on the implementation. For instance, in some examples as in FIG. 2, trailing arms are round metal tubes. In other examples, such as in FIG. 3, the trailing arms may have a shape resembling I-beams.

Electrically, the connections within trailing assembly 200 provide a path for the conduction of electrical power from power rail 108 to the conductors within extension 110. As work machine 100 moves along haul route 101, extension 110 pulls trailing arms 116 generally parallel to the X axis. Current collector 118 rests on power rail 108 and is thereby caused to slide along the surface of inner rail 108A, middle rail 108B, and outer rail 108C during movement of work machine 100. While sliding, current collector 118 maintains physical and electrical contact with power rail 108, passing electrical power from power rail 108 to trailing arms 116.

Mechanically, the combined actions of the lugs and hinges within rotational interface 202 and within current collector 118 enable flexible and versatile movement of trailing arms 116 between extension 110 and current collector 118. As work machine 100 moves forward (in the direction of the X axis), trailing arms 116 and current collector 118 trail behind extension 110. If the position of extension 110 changes with respect to the position of current collector 118, trailing assembly 200 permits trailing arms 116 to move in several directions and maintain the connection between current collector 118 and power rail 108. Risks of current collector 118 disconnecting from power rail 108 or causing arcing due to smaller deviations as work machine 100 travels along haul route 101 may be caused by variations in the alignment of power rail 108 or imperfections in the surface conditions of inner rail 108A, middle rail 108B, or outer rail 108C. While FIG. 2 depicts one option for mechanical and electrical interfaces between current collection 118 and conductor rod 110, FIGS. 3-6 illustrate another implementation to accommodate relative movement between work machine 100 and current collector 118.

Figure 3:
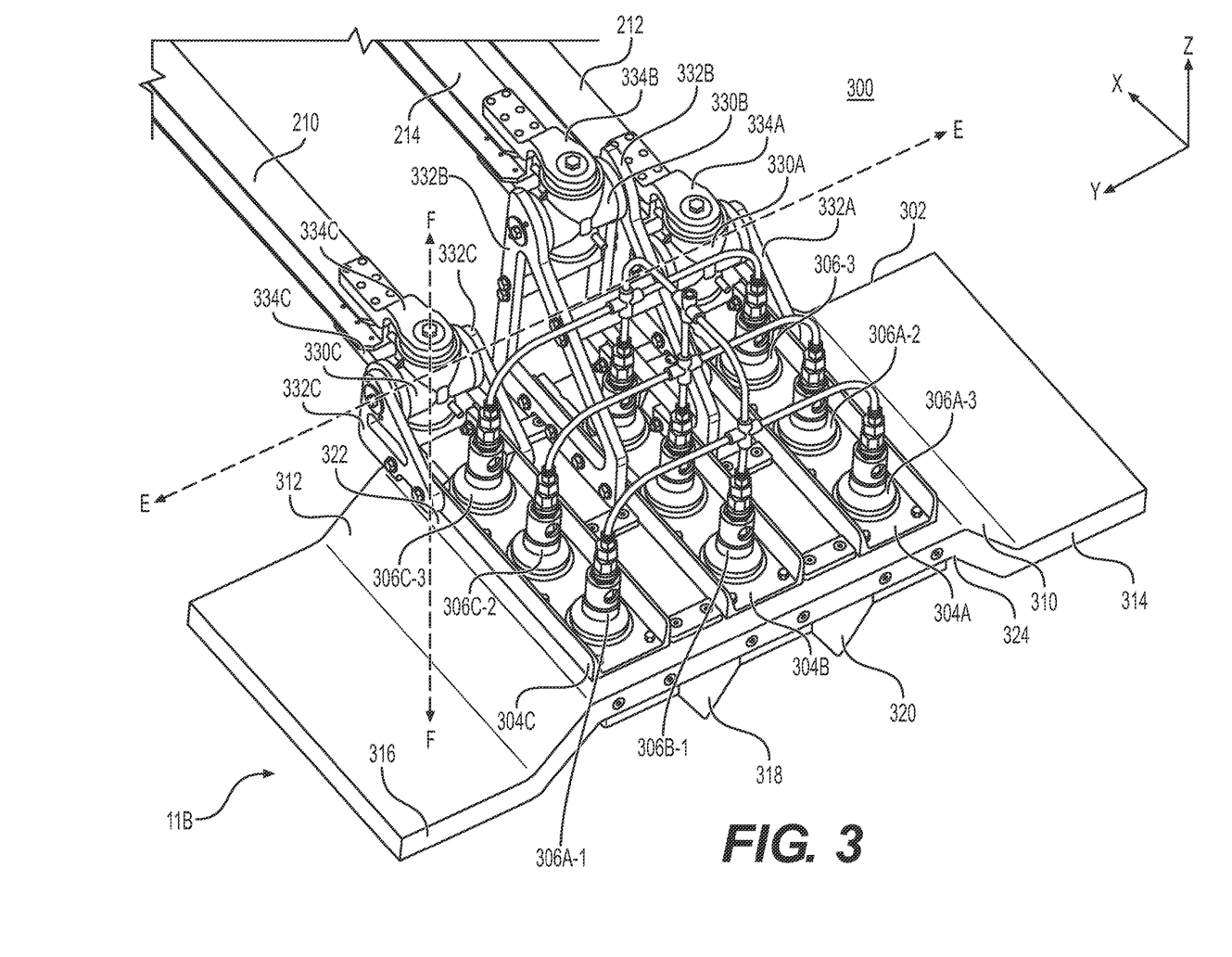
FIG. 3 is an isometric view of an electrically conductive assembly of trailing arms and a current collector having electromechanical joints in accordance with an example of the present disclosure.

FIG. 3 illustrates an isometric view of an electrically conductive assembly 300 formed from current collector 118 and end portions of trailing arms 116. The view looks inward and forward with respect to conductor rod 106, i.e., looking between the +X axis and the —Y axis. In other words, FIG. 3 essentially shows a view of current collector 118 from behind and toward extension 110 as current collector 118 would rest on power rail 108. This perspective is similar to FIG. 2. In the illustrated examples, current collector 118 generally includes at least a frame 302, busbars (referred to collectively as 304) as conductors associated with respective trailing arms 116, and one or more terminals (referred to collectively as 306) interfacing between power rail 108 and busbars 304. Each of these components is discussed below.

Frame 302 serves as a structural base for current collector 118. To decrease drag on conductor rod 106, frame 302 may be constructed with dielectric materials that are light in weight yet structurally resilient. In some examples, an exterior of frame 302 is made of fiberglass while an interior is a foamed material such as a polymer, and the overall frame weighs about 5 KG. Other material options and weights for frame 302 are available and will be apparent to those of ordinary skill in the art based on the intended implementation. As illustrated in FIG. 3, frame 302 roughly resembles a hat in its shape and may have a substrate 308 within the X-Y plane at its center. Substrate 308 is substantially flat across the X-Y plane and configured in operation to be positioned on top of and parallel to power rail 108. At opposing lateral sides (i.e., along the Y axis), substrate 308 merges with an angled inner side 310 and an angled outer side 312, which merge respectively with an inner flange 314 and an outer flange 316. The angled inner side 310 and angled outer side 312 each transition a height of frame 302 (dimensionally along the Z axis) from a top surface 322 on substrate 308 to inner flange 314 and outer flange 316. An inner bumper 318 and an outer bumper 320 are attached to frame 302 at an underside 324 of substrate 308 and help keep current collector 118 aligned on power rail 108 during movement of work machine 100.

Mounted on top surface 322 of substrate 308, busbars 304 are conductors that provide electrical interconnections between current collector 118 and trailing arms 116. Accordingly, busbars 304 in some examples are plates of aluminum or similar conductive material attached to top surface 322 through bolts or similar attachment devices. One busbar is shown for each rail within power rail 108. For a system as in FIGS. 1 and 2 having three power rails, substrate 308 includes an inner busbar 304A corresponding to inner rail 108A, a middle busbar 304B corresponding to middle rail 108B, and an outer busbar 304C corresponding to outer rail 108C. In some examples, each of the busbars 304 is secured on top surface 322 as rectangular or U-shaped strips positioned in general alignment with its corresponding power rail. Thus, in the example of FIG. 3, inner busbar 304A is mounted on substrate 308 parallel to the X axis and to inner rail 108A underneath (FIG. 2), as is middle busbar 304B parallel to and over middle rail 108B and outer busbar 304C over outer rail 108C. Each of the busbars 304 provides a connection to a corresponding one of trailing arms 116 (FIG. 2), i.e., outer arm 210, inner arm 212, and middle arm 214, in a manner described in detail below.

In addition, current collector 118 includes one or more terminals 306 that are secured within busbars 304 and substrate 308. Terminals 306 provide electrical conductivity between power rail 108 and busbars 304. Specifically, while not shown in FIG. 3, each of inner busbar 304A, middle busbar 304B, outer busbar 304C, and substrate 308 has holes through it for receiving and retaining terminal 306. At underside 324 of substrate 308, terminals 306 contact power rail 108 and remain in contact as work machine 100 travels along haul route 101. Terminals 306 conduct electrical power from power rail 108 to busbars 304, which then conduct the electrical power to trailing arms 116 for use by work machine 100. In some examples, a plurality of terminals 306 are employed for each power rail. In the example of FIG. 3, current collector 118 has three terminals 306 accessing electrical power from each power rail. Namely, first inner terminal 306A-1, second inner terminal 306A-2, and third inner terminal 306A-3 are affixed within inner busbar 304A and configured to slide across inner rail 108A. In this context, the suffix "-n" designates multiple occurrences of a component associated with a common conductor rail, e.g., "A-1" and "A-2" as multiple ones of the same component associated with inner rail 108A. Similarly, first middle terminal 306B-1, second middle terminal 306B-2, and third middle terminal 306B-3 are affixed within middle busbar 304B and configured to slide across middle rail 108B. Finally, first outer terminal 306C-1, second outer terminal 306C-2, and third outer terminal 306C-3 are affixed within 304C and configured to slide across outer rail 108C.

FIG. 3 illustrates an example of electromechanical joints connecting current collector 118 to trailing arms 116 that allow pivotal movement between the trailing arms and the current collector in multiple dimensions while also conducting high voltage electrical power. In particular, cross joints 330, shown individually in FIG. 3 as inner cross joint 330A, middle cross joint 330B, and outer cross joint 330C, are situated between current collector 118 and trailing arms 116. In a first geometric dimension, cross joints 330 permit trailing arms 116 to rotate about an axis substantially parallel to top surface 322 of current collector 118, which is in turn essentially parallel to a top surface of power rail 108. Namely, FIG. 3 indicates an axis E-E that runs horizontal (i.e., along the Y axis in the figure) through a center of inner cross joint 330A and outer cross joint 330C. Inner cross joint 330A and outer cross joint 330C enable rotation or pivoting of inner arm 212 and outer arm 210, respectively, about axis E-E in response to movement by conductor rod 106, in a manner detailed below. In a second geometric dimension, cross joints 330 permit trailing arms 116 to rotate or pivot about an axis substantially perpendicular to top surface 322 of current collector 118. For instance, as shown in FIG. 3, an axis F-F runs essentially vertical (i.e., along the Z axis in the figure) through a center of outer cross joint 330C. Outer cross joint 330C enables rotation or pivoting of outer arm 210 about axis F-F in response to movement by conductor rod 106, in a manner detailed below. Although not shown, middle cross joint 330B enables similar rotation in two orthogonal dimensions about axes respectively parallel to axis E-E and axis F-F.

Therefore, cross joints 330 enable mechanical movement of trailing arms 116 with respect to current collector 118 in at least two dimensions, i.e., up and down in the X-Z plane and side-to-side in the X-Y plane. This vertical or lateral movement of trailing arms 116 may arise from a lowering or raising of conductor rod 106 (FIG. 1) or from an extension or contraction of extension 110 (FIG. 2) while current collector 118 remains comparatively stable on power rails 108. On the other hand, cross joints 330 also enable mechanical movement of current collector 118 with respect to trailing arms in the same two dimensions. Thus, if current collector 118 were to shift along power rails 108 laterally, cross joints 330 rotate or pivot about axis F-F and movement in the X-Y plane. As well, if current collector 118 were to move up or down relative to trailing arms 116, such as due to nonlinearities in power rail 108, cross joints 330 will rotate or pivot about axis E-E and move accordingly in the X-Z plane while trailing arms remain comparatively stable. In addition, rotational interface 202 (FIG. 2) also enables movement of trailing arms 116 and current collector 118 rotation in a third dimension angularly, i.e., in the Y-Z plane. The following discussion details the structure and operation of cross joints 330.

In some examples, cross joints 330 are rotationally secured between current collector 118 and trailing arms 116 by couplings referred to as yokes. Yokes are generally referred to as contactor yokes 332, which are attached to current collector 118, and arm yokes 334, which are attached to trailing arms 116. Yokes provide structure to support cross joints 330 to enable rotation of the cross joints about at least one axis and enable simultaneous conduction of electrical power from power rail 108 to work machine 100. Contactor yokes 332 and arm yokes 334 may be made of any material providing high structural strength, low weight, and high electrical conductivity, such as aluminum and aluminum alloys or similar metals. In some examples, a yoke includes two planar portions, such as first planar side 404 and second planar side 406 (FIG. 4), arranged on opposite sides of a cross joint for lateral stability. While a yoke may be made of multiple parts that function together, such as separate planar portions, the following discussion addresses each yoke as a single component for simplicity.

FIG. 3 illustrates three contactor yokes 332 attached to current collector 118, termed inner contactor yoke 332A, middle contactor yoke 332B, and outer contactor yoke 332C. As indicated, the three contactor yokes are affixed to current collector 118 in positions corresponding to each of the three rails of power rail 108. Thus, inner contactor yoke 332A is connected to inner busbar 304A, middle contactor yoke 332B is connected to middle busbar 304B, and outer contactor yoke 332C is connected to outer busbar 304C. The yokes may be affixed or secured to respective busbars by any suitable means to provide mechanical stability and electrical continuity. Bolts are one option, although many other attachment devices may be employed based on the implementation. As shown in FIG. 3, in one example, inner contactor yoke 332A and outer contactor yoke 332C generally have a same height from top surface 322 in the Z direction such that inner cross joint 330A and outer cross joint 330C are approximately aligned along the Y direction about axis E-E. In this example, middle contactor yoke 332B has a greater height above top surface 322 in the Z direction such that middle cross joint 330B is elevated above inner cross joint 330A and outer cross joint 330C with respect to current collector 118. This arrangement helps accommodate the triangular configuration of the linkage formed with trailing arms 116, as shown in FIG. 2, with middle arm 214 being higher in the Z direction than inner arm 212 and outer arm 210.

Together with contactor yokes 332, cross joints 330 may include arm yokes 334 providing connection to trailing arms 116. Three arm yokes 334, termed inner arm yoke 334A, middle arm yoke 334B, and outer arm yoke 334C, are respectively affixed to inner arm 212, middle arm 214, and outer arm 210. The arm yokes 334 may be affixed or secured to respective trailing arms by any suitable means to provide mechanical stability and electrical continuity. Bolts are one option, although many other attachment devices may be employed based on the implementation. In the example of FIG. 3, arm yokes 334 are connected to trailing arms 116 in a manner to provide rotational attachment for cross joints 330 about a vertical axis substantially parallel to the Z axis in the figures. Thus, as shown for outer cross joint 330C in FIG. 3 and more closely in FIG. 4, whether as one component or as multiple pieces, arm yoke 334C attaches to a top and bottom in the Z direction of outer cross joint 330C along axis F-F.

Figure 4:
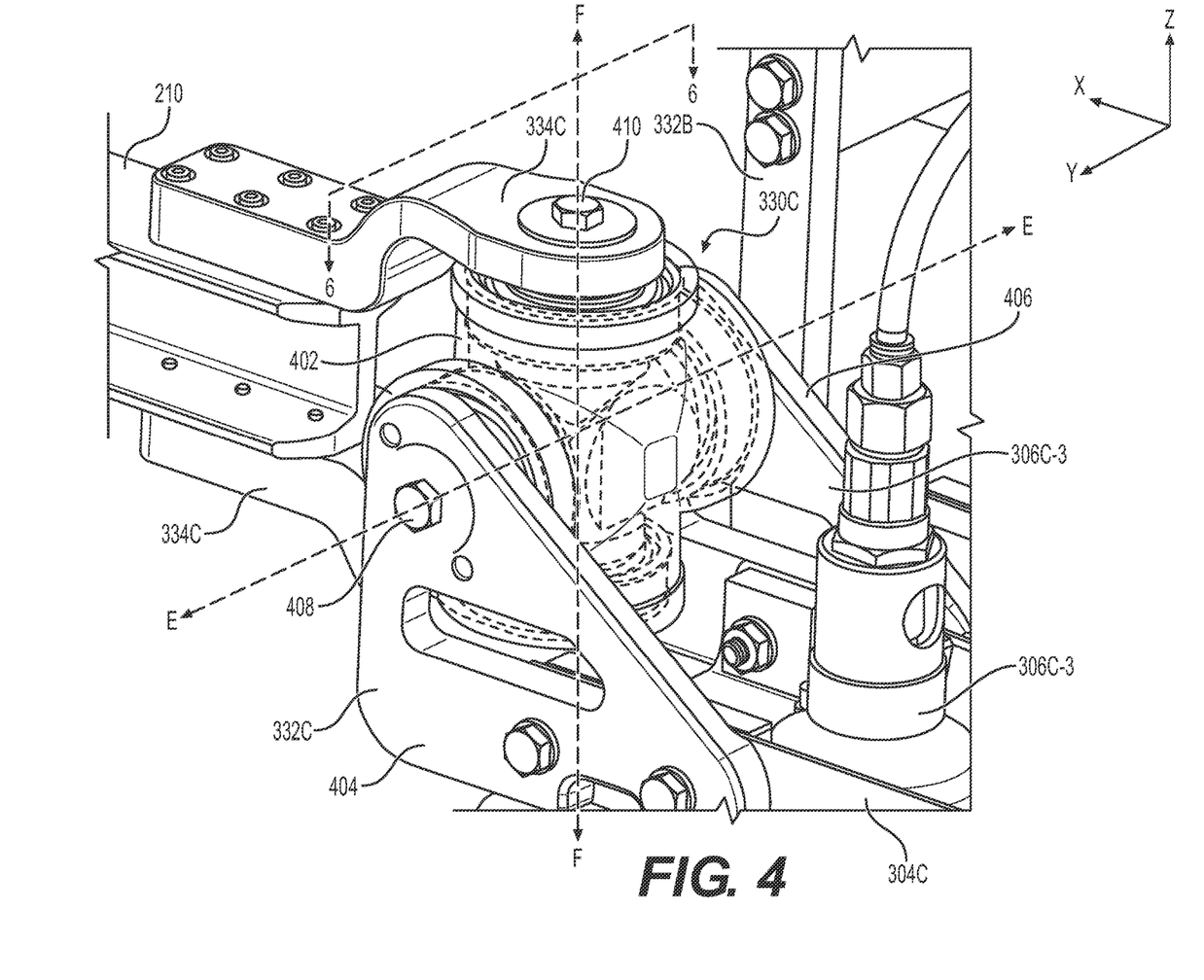
FIG. 4 is an isometric view of one of the electromechanical joints held by orthogonal yokes of FIG. 3 in accordance with an example of the present disclosure.

FIG. 4 provides a closer perspective of outer cross joint 330C, outer contactor yoke 332C, and outer arm yoke 334C of FIG. 3 viewed near angled outer side 312 of current collector 118. Outer cross joint 330C includes a housing 402 that encloses an interior region with components shown in phantom lines that are discussed in more detail below regarding FIGS. 5 and 6. First planar side 404 and second planar side 406 of outer contactor yoke 332C are attached to outer busbar 304C and provide a secure structure for horizontally mounting outer cross joint 330C. Although mounting of cross joints can take place in any fashion suitable for the implementation, FIG. 4 illustrates side bolt 408 for connecting first planar side of outer contactor yoke 332C to outer cross joint 330C. Accordingly, upon vertical movement of outer arm 210 due, for example, to a lowering or raising of conductor rod 106 (FIG. 1), outer cross joint 330C and outer arm 210 can respond to the corresponding forces by pivoting about axis E-E (in the X-Z plane) and help keep current collector 118 positioned on power rails 108. Similarly, outer arm yoke 334C is affixed to outer arm 210 and provides a secure structure for vertically mounting outer cross joint 330C using top bolt 410 or a similar mechanism. Therefore, upon lateral movement of outer arm 210 due, for example, to an extension or contraction of extension 110 (FIG. 2), outer cross joint 330C and outer arm 210 can respond to the corresponding forces by pivoting about axis F-F (in the X-Y plane) and help keep current collector 118 positioned on power rails 108.

Figure 5:
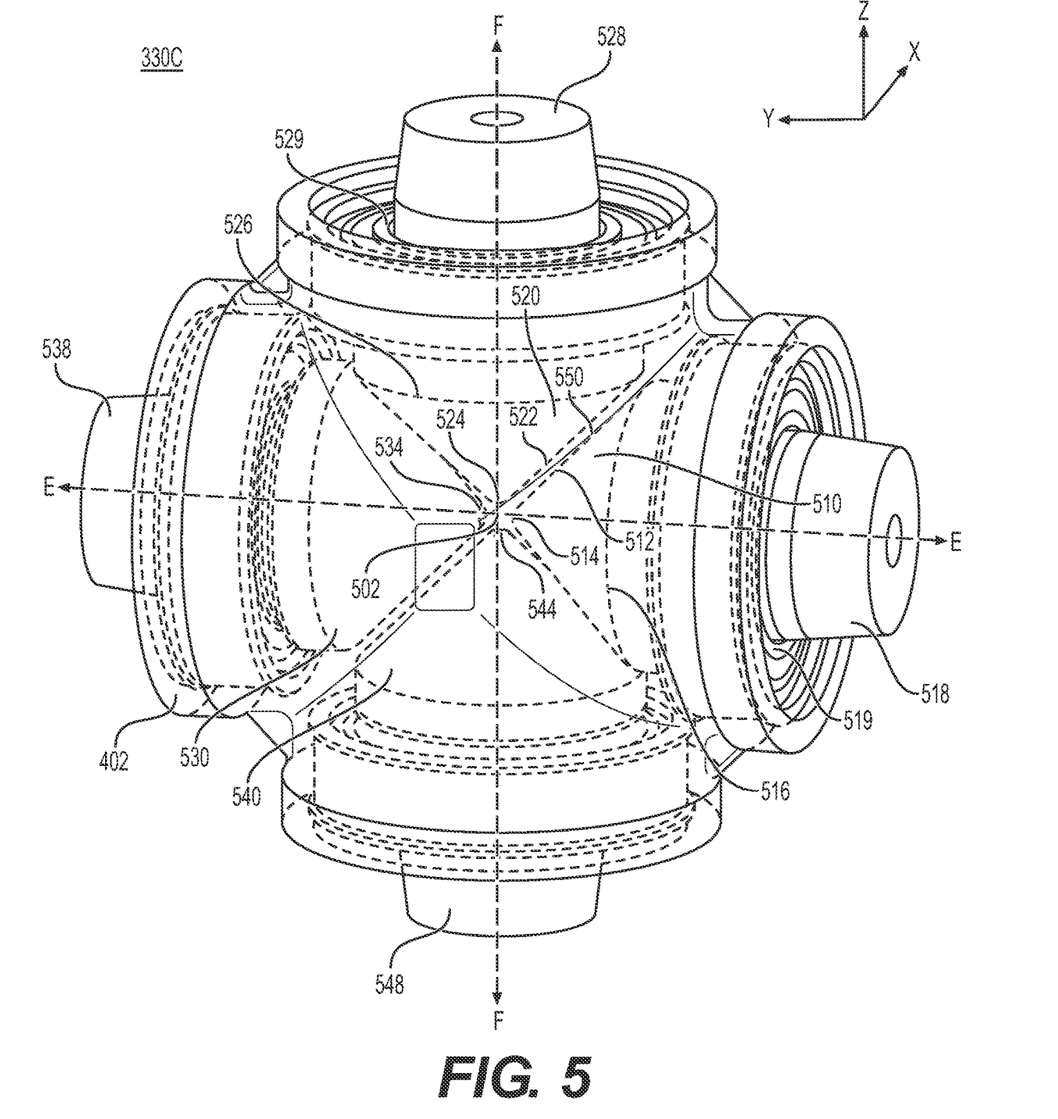
FIG. 5 is an isometric transparent view of the electromechanical joint of FIG. 4 separated from support structure in accordance with an example of the present disclosure.
Figure 6:
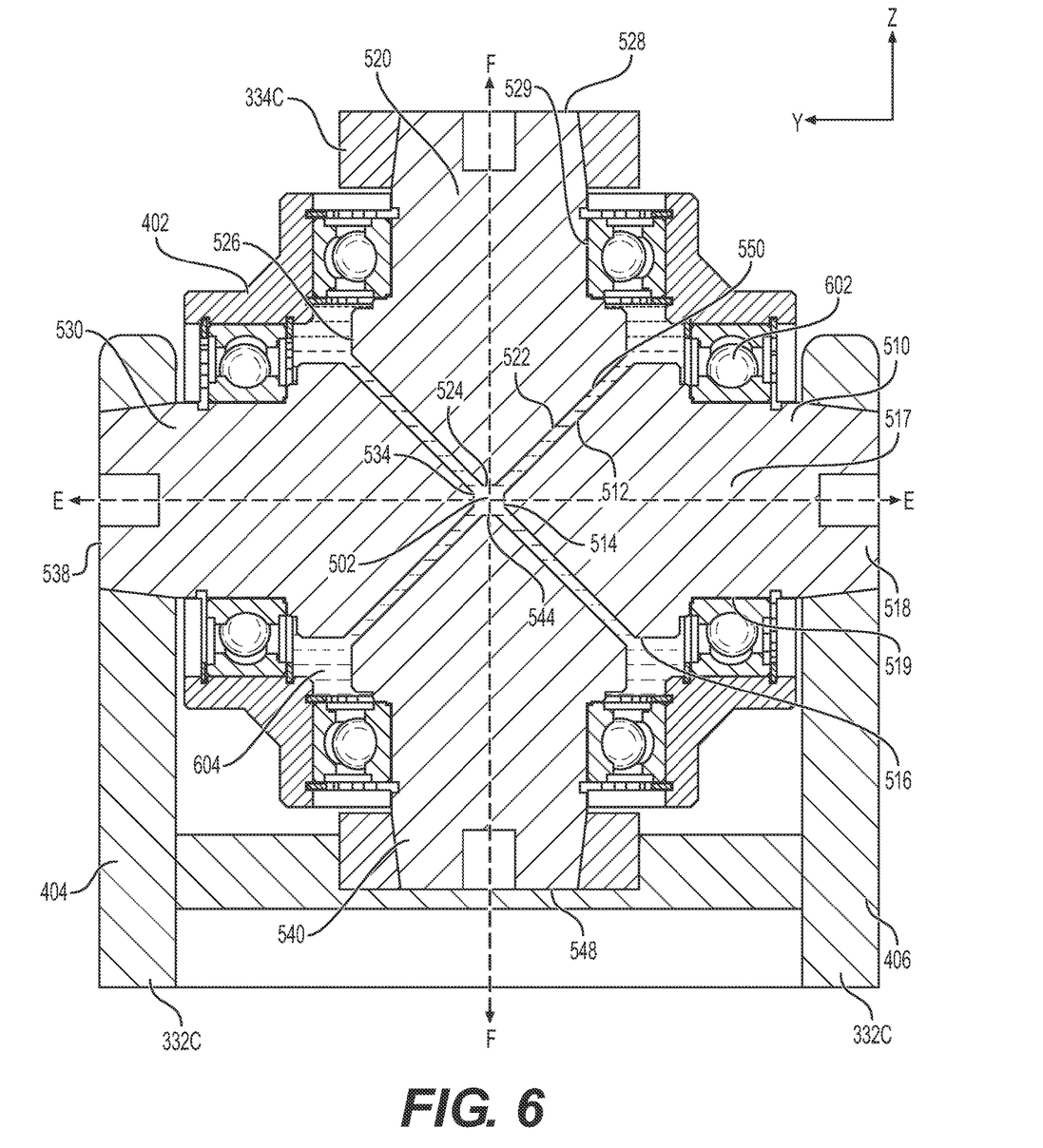
FIG. 6 is a cross-sectional front view of an electromechanical joint of FIG. 4 in accordance with an example of the present disclosure.

While FIGS. 3 and 4 show external connections for cross joints 330 within electrically conductive assembly 300, FIGS. 5 and 6 illustrate additional detail regarding the internal structure and operation of a representative cross joint. FIG. 5 is an isometric view of a front of outer cross joint 330C (generally in the direction of the X axis) in transparency with internal components shown in phantom lines. FIG. 6 is a partial cross section of outer cross joint 330C in FIG. 4 including portions of outer contactor yoke 332C and outer arm yoke 334C without connection hardware such as side bolt 408 and top bolt 410.

As shown in FIGS. 5 and 6, outer cross joint 330C is generally cross-shaped and includes housing 402 as an outer shell. Housing 402 may be any material providing suitable weight and structural characteristics for the implementation and, in one example, is formed from aluminum coated with stainless steel. In some examples, outer cross joint 330C and its housing 402 is substantially symmetrical about axis E-E and about axis F-F and has a centroid 502 approximately at a geometric center of housing 402. Centroid 502 may be generally equidistant between first planar side 404 and second planar side 406 of outer contactor yoke 332C, for instance. Likewise, centroid 502 may be generally equidistant between attachments of outer arm yoke 334C to outer cross joint 330C.

Within housing 402, outer cross joint 330C includes at least a first shaft 510, shown in FIGS. 5 and 6. First shaft 510 may be formed of a structurally resilient and electrically conductive material, such as stainless steel. In one example, first shaft 510 is generally conical in shape, having at least a first conical surface 512 extending from a first apex 514 to a first base 516. As shown in the figures, first apex 514 is positioned proximate to and facing centroid 502, while first base 516 is closer to an exterior of housing 402 than is first apex 514. First shaft 510 may be formed to have additional shapes as it extends toward an exterior of housing 402, such as a first rod portion 517, culminating in a first hub 518. In some examples, first hub 518 projects external to housing 502 for attachment to second planar side 406 of outer contactor yoke 332C (FIG. 6). First shaft 510 may be generally aligned along longitudinal axis E-E, with axis E-E extending from first apex 514 to a center of first hub 518. First shaft 510 is positioned along axis E-E and encased by housing 402 to form a first rotary interface 519 around first rod portion 517. As illustrated in FIG. 6, bearings 602 or similar structures may be employed to facilitate rotation of first shaft 510 about axis E-E. Although not detailed in FIG. 6, bearings 602 may be part of a rotary seal, formed from Teflon as an example, to enable frictional rotation at first rotary interface 519 while preventing leakage of conductive fluid 604, which is discussed below, outside of housing 402.

Outer cross joint 330C may also include a second shaft 520 formed of a similar shape and materials. Specifically, second shaft 520 may also be stainless steel and have a generally conical shape formed by a second conical surface 520 extending from a second apex 524 to a second base 526. An outer end of second shaft 520 extending away from centroid 502 may have different shapes such as a rod culminating in a second hub 528. Second hub 528 may be attached to outer arm yoke 334C, as shown in FIG. 6. In some examples, second shaft 520 is generally aligned along longitudinal axis F-F, with axis F-F extending from second apex 524 to a center of second hub 528. Second shaft 520 is positioned along axis F-F and encased by housing 402 to form second rotary interface 529. A portion of second shaft 520 between second base 526 and second hub 528 is configured to form a second rotary interface 529 with housing 402 to facilitate rotation of second shaft 520 about axis F-F in a manner similar to that described above for first shaft 510.

In some examples, the structure and position of first shaft 510 and second shaft 520 permit free rotational movement of each shaft about its respective longitudinal axis together with conduction of electrical power from one shaft to the other. For the example of FIG. 6 in which first shaft 510 and second shaft 520 include substantially conical portions, first conical surface 512 and second conical surface 522 are positioned to be set apart from each other by a gap or separation 550. In some examples, first conical surface 512 and second conical surface 522 are substantially parallel to each other, causing separation 550 to have a constant distance between the surfaces. In other examples, first conical surface 512 and second conical surface 522 are not parallel. In either situation, separation 550 enables first shaft 510 and second shaft 520 to move freely about their respective axes E-E and F-F with contacting each other. Typically, axes E-E and F-F will be substantially orthogonal as illustrated, although other angular relationships between the axes and the resulting movement of the shafts are contemplated.

A conductive fluid 604 may fill separation 550 between first shaft 510 and second shaft 520. Conductive fluid 604 may be any flowable conductive material. In one example, conductive fluid 604 is Galinstan, which is a eutectic alloy composed of gallium, indium, and tin. Galinstan melts at −19 C (−2 F) and is thus liquid at room temperature. Mercury or other liquid metals or conductive fluids having comparable electrical and rheological properties to Galinstan may be used and are considered to be within the scope of the presently disclosed subject matter. Conductive fluid 604 provides a flowable conductive medium bridging first shaft 510 and second shaft 520. Thus, the structure of outer cross joint 330C, as with all cross joints 330, enables the conduction of electrical power entering the cross joint along one axis, such as axis E-E via first shaft 510, to cross into a path on an orthogonal or otherwise different axis, such as axis F-F via second shaft 520. At the same time, the conductive fluid may help serve somewhat as a lubricant between first conical surface 512 and second conical surface 520 when either first shaft 510 or second shaft 520 are caused to rotate.

As depicted in the examples of FIGS. 5 and 6 for outer cross joint 330C, a cross joint 330 may include additional shafts besides first shaft 510 and second shaft 520. Specifically, in some examples, cross joint 330 includes a third shaft 530. As shown, third shaft 530 has substantially the same shape as first shaft 510 and is positioned along longitudinal axis E-E symmetrically with first shaft 510. As a result, third shaft 530 has a third apex 534 disposed proximate to centroid 502 and facing first apex 514. Similarly, third shaft 530 includes a third hub 538 extending through housing 402 to an exterior for attachment to first planar side 404 of outer contactor yoke 332C. Similarly, in some examples, cross joint 330 includes a fourth shaft 540. As shown, fourth shaft 540 has substantially the same shape as second shaft 520 and is positioned along longitudinal axis F-F symmetrically with second shaft 520. As a result, fourth shaft 540 has a fourth apex 544 disposed proximate to centroid 502 and facing second apex 524. Each of first shaft 510, second shaft 520, third shaft 530, and fourth shaft 540 may be positioned to be separated from and not to contact any of the other shafts. As a result, separation 500 will extend not only between first conical surface 512 and second conical surface 522, but between all surfaces of the shafts. In some embodiments, conductive fluid 604 fills all open spaces within housing 402 and is enclosed within housing 402 by seals formed by first rotary interface 519, second rotary interface 529, and similar interfaces for any of third shaft 530 and fourth shaft 540.

In operation, separation 550 between surfaces of the four shafts within cross joint 330, together with conductive fluid within separation 550, will help provide simultaneous rotational movement and electrical conduction between the shafts. As will be appreciated, forces on outer arm 210 and outer arm yoke 334C in the Z direction with respect to an otherwise stable current collector 118 will cause second shaft 520 and fourth shaft 540 to pivot about axis E-E while first shaft 510 and third shaft 530 remain stationary. In particular, while first shaft 510 and third shaft 530 are held in place by outer contactor yoke 332C, the forces acting on outer arm yoke 334C will cause pivoting in the X-Z plane of first shaft 510, third shaft 530, and housing 402 around first rotary interface 519 and a third rotary interface (not shown) associated with third shaft 530. Likewise, forces on outer arm 210 and outer arm yoke 334C in the Y direction with respect to an otherwise stable current collector 118 will cause second shaft 520, fourth shaft 540, and housing 402 to rotate in the X-Y plane around second rotary interface 529 and a fourth rotary interface (not shown) associated with fourth shaft 540 while first shaft 510 and third shaft 530 remain stationary.

If similar forces are imparted on current collector 118 and outer collector yoke 332C with an otherwise stable outer arm 210, similar motion will be enabled. For instance, forces on outer collector yoke 332C in the Z direction with respect to an otherwise stable outer arm 210 will cause first shaft 510 and third shaft 520 to rotate about axis E-E while second shaft 520 and fourth shaft 540 remain stationary. And forces on outer collector yoke 332C in the Y direction with respect to an otherwise stable outer arm 210 will cause first shaft 510 and third shaft 530 to pivot about axis F-F while second shaft 520 and fourth shaft 540 remain stationary. During these movements, electrical power is conducted from outer busbar 304C to outer contactor yoke 332C, to first shaft 510 and third shaft 530, through conductive fluid 604, to second shaft 520 and fourth shaft 540, to outer arm yoke 334C, and to outer arm 210 for eventual use by work machine 100.

While the examples of FIGS. 5 and 6 illustrate a cross joint 330 having four shafts with portions being conical in shape, variations of this internal structural are also contemplated. Specifically, one or more of first shaft 510, second shaft 520, third shaft 530, and fourth shaft 540 may be omitted or combined. For instance, cross joint 330 could omit fourth shaft 540 or third shaft 530 and function mechanically and electrically. An omission of one or more shafts, however, could enlarge separation 550 and require greater quantities of conductive fluid 604 than depicted in FIG. 6. Also, two aligned shafts, such as first shaft 510 and third shaft 530 could be connected, while keeping separation 550 between the remaining shafts, such as second shaft 520 and fourth shaft 540. In other examples, the shafts have shapes other than conical. In addition, while two orthogonal axes E-E and F-F are described, other axes and corresponding shafts may be included to enable movement in additional dimensions with simultaneous electrical conduction.

Figure 7:
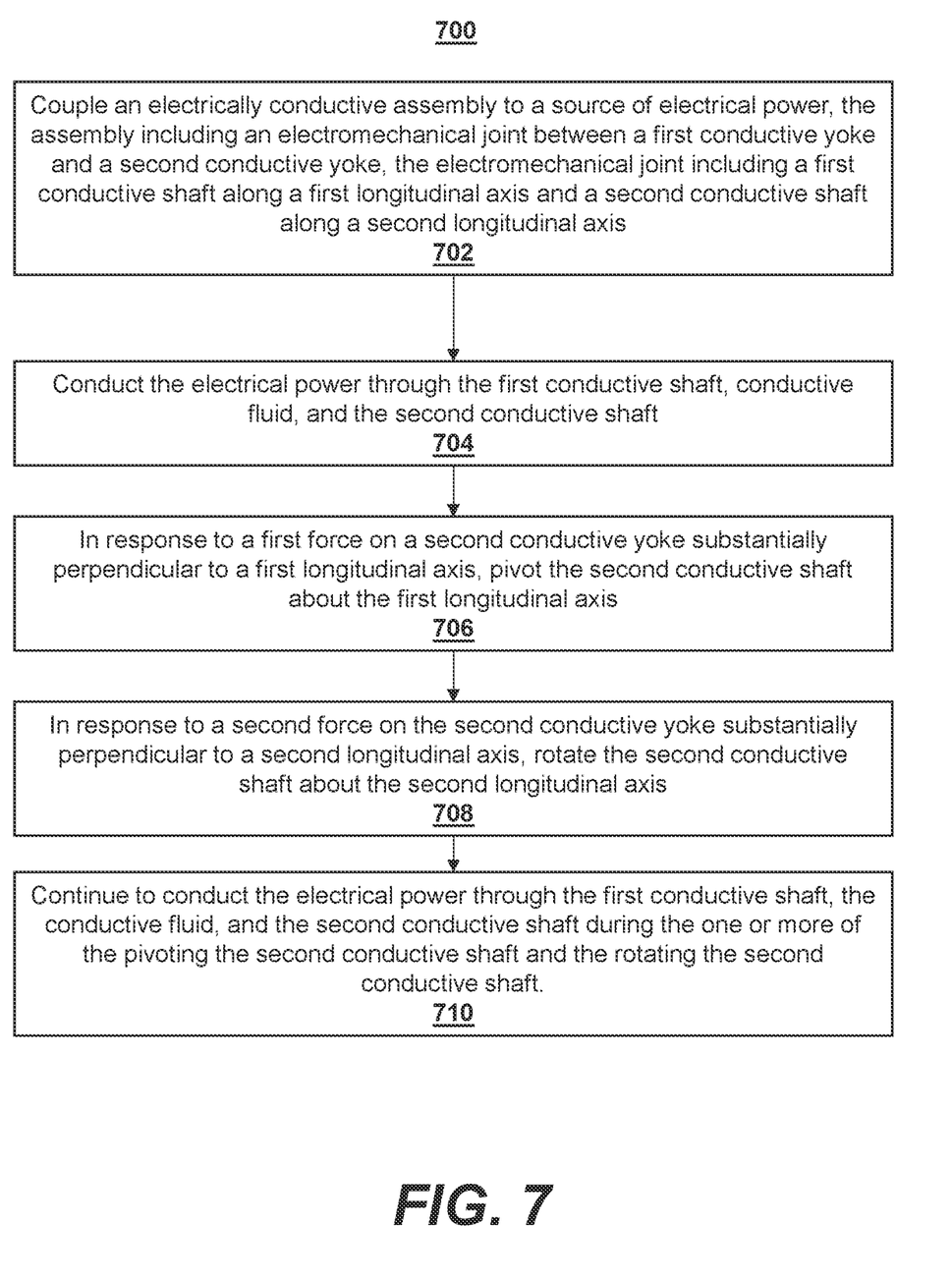
FIG. 7 is a flowchart of a method of providing electrical power through a moveable joint in accordance with an example of the present disclosure.

A method for providing electrical power through a moveable joint is defined by representative steps consistent with the present disclosure in the flowchart of FIG. 7. For the method of FIG. 7, the steps in which the method is described are not intended to be construed as a limitation. Any number of steps can be combined in any order to implement the disclosed method, can be performed in parallel to implement the processes, and in some embodiments, one or more blocks of the process can be omitted entirely. Moreover, the processes can be combined in whole or in part with other methods.

In FIG. 7, the method 700 begins with a step 702 of coupling an electrically conductive assembly to a source of electrical power. The electrically conductive assembly includes an electromechanical joint between a first conductive yoke and a second conductive yoke. The electromechanical joint includes a first conductive shaft along a first longitudinal axis, a second conductive shaft along a second longitudinal axis and separated from the first conductive shaft, and a conductive fluid between the first conductive shaft and the second conductive shaft. In step 704, electrical power is conducted through the first conductive shaft, the conductive fluid, and the second conductive shaft. FIG. 6, for instance, depicts this path of conduction from first shaft 510, through conductive fluid 604 within separation 550, and into second shaft 520.

Method 700 continues with step 706 where, in response to a first force on the second conductive yoke substantially perpendicular to the first longitudinal axis, the second conductive shaft is pivoted about the first longitudinal axis. For example, when a force perpendicular to axis E-E is applied to outer arm yoke 334C in FIG. 6, second shaft 520 is caused to pivot about axis E-E. The method 700 further includes step 708 where, in response to a second force on the second conductive yoke substantially perpendicular to the second longitudinal axis, the second conductive shaft is rotated about the second longitudinal axis. In particular, FIG. 6 shows the structure where when a force perpendicular to axis F-F is applied to outer arm yoke 334C, second shaft 520 is caused to rotate about axis F-F.

Finally, method 700 concludes with step 710 of continuing to conduct the electrical power through the first conductive shaft, the conductive fluid, and the second conductive shaft during the one or more of the pivoting the second conductive shaft and the rotating the second conductive shaft. Conductive fluid 604, which may be Galinstan, fills the voids between first shaft 510, second shaft 520, third shaft 530, and fourth shaft 540, such that electrical power may be conducted between the shafts during their movements of rotation or pivoting.

Those of ordinary skill in the field will appreciate that the principles of this disclosure are not limited to the specific examples discussed or illustrated in the figures. For example, while cross joints 330 are described as components bridging lower ends of trailing arms 116 with current collector 118, cross joints 330 may also be employed at upper ends of trailing arms 116 as part of connector assembly 114. Moreover, while the disclosure describes three cross joints 330 and three trailing arms 116, more or fewer of each components may be used depending on the implementation. In addition, the principles disclosed are not limited to implementation on a work machine. Any electromechanical connection including any moving vehicle deriving electrical power from a ground-based conductor rail could benefit from the examples and techniques disclosed and claimed.

INDUSTRIAL APPLICABILITY

The present disclosure provides systems and methods for conducting electrical power through a moveable joint such as when sliding a current collector across conductor rails to deliver electrical power to a moving work machine. An electromechanical joint provides rotational movement in at least two dimensions while conducting electrical power between orthogonal hubs. The joint, shaped as a cross, has four conical shafts positioned orthogonally and apart from each other within an interior of a housing. Apexes of the conical shafts face each other proximate a centroid of the housing. A conductive fluid, such as Galinstan, fills recesses between the conical shafts. Separate yokes attached to pairs of the hubs may impart forces on the shafts, causing the shafts and the yokes to rotate around orthogonal axes. The shaft rotate within the conductive fluid, which provides simultaneous conduction of electrical power between the hubs. The yokes may be affixed respectively to a current collector and conductive arms of the work machine for more flexible movement and power conduction without the need for added components.

As noted above with respect to FIGS. 1-7, an electromechanical joint 330 includes a housing 402 having an enclosed interior, a first conductive shaft 510, a second conductive shaft 520, and a conductive fluid 604 within the enclosed interior. The first conductive shaft extends into the enclosed interior along a first longitudinal axis E-E. The second conductive shaft is separated from the first conductive shaft and extends into the enclosed interior along a second longitudinal axis F-F. The second conductive shaft is rotatable about the second longitudinal axis and is pivotable about the first longitudinal axis. The conductive fluid 604 fills recesses between the first conductive shaft 510 and the second conductive shaft 520, permitting free movement of the conductive shafts and conduction of electrical power from the first conductive shaft to the second conductive shaft.

In the examples of the present disclosure, conductive fluid 604 provides partial lubrication for rotation of first shaft 510 and second shaft 520 as well as conduction for electrical power between the shafts. The shafts, mounted on rotary interfaces such as first rotary interface 519 and second rotary interface 529, can react to mechanical forces imparted on respective hubs, such as first hub 518 and second hub 528. As a result, when positioned orthogonally to each other, first shaft 510 and second shaft 512 can enable movement of structures attached to first hub 518 and second hub 528 in orthogonal planes while simultaneously conducting high voltage electrical power. By shaping first shaft 510 and second shaft 520 as cones, empty space between the shafts can be minimized, thereby minimizing the amount of conductive fluid within housing 402. As a result, an electromechanical joint can provide multi-dimensional movement and electrical conduction without requiring additional components such as power cables, making the joints light in weight and useful for implementations such as a current collector for a work machine.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially parallel" need not be exactly 180 degrees but may also encompass slight variations of a few degrees based on the context. While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An electromechanical joint, comprising:
   a housing having an enclosed interior;
   a first conductive shaft extending into the enclosed interior along a first longitudinal axis;
   a second conductive shaft, separated from the first conductive shaft, extending into the enclosed interior along a second longitudinal axis different from the first longitudinal axis, the second conductive shaft being rotatable about the second longitudinal axis and pivotable about the first longitudinal axis; and
   conductive fluid within the enclosed interior between the first conductive shaft and the second conductive shaft.

2. The electromechanical joint of claim 1, wherein the first longitudinal axis and the second longitudinal axis are substantially orthogonal, and the first conductive shaft is rotatable about the first longitudinal axis and pivotable about the second longitudinal axis.

3. The electromechanical joint of claim 2, wherein the first longitudinal axis and the second longitudinal axis intersect at a centroid of the housing.

4. The electromechanical joint of claim 1, further comprising:
   a third conductive shaft extending into the enclosed interior along the first longitudinal axis opposite the first conductive shaft, the third conductive shaft being separated from the first conductive shaft and being rotatable about the first longitudinal axis independent from the first conductive shaft.

5. The electromechanical joint of claim 4, further comprising:
   a fourth conductive shaft extending into the enclosed interior along the second longitudinal axis opposite the second conductive shaft, the fourth conductive shaft being separated from the second conductive shaft and being rotatable about the second longitudinal axis independent from the second conductive shaft.

6. The electromechanical joint of claim 5, wherein the first conductive shaft has a first conical surface between a first apex and a first base, the second conductive shaft has a second conical surface between a second apex and a second base, and the first apex and the second apex are disposed proximate a centroid of the housing.

7. The electromechanical joint of claim 6, wherein the third conductive shaft has a third conical surface between a third apex and a third base, and the first apex faces the third apex along the first longitudinal axis.

8. The electromechanical joint of claim 7, wherein the fourth conductive shaft has a fourth conical surface between a fourth apex and a fourth base, and the second apex faces the fourth apex along the second longitudinal axis.

9. The electromechanical joint of claim 7, wherein at least a first portion of the first conical surface is substantially parallel to and faces at least a second portion of the second conical surface, and at least a third portion of the third conical surface is substantially parallel to and faces at least a fourth portion of the fourth conductive shaft.

10. The electromechanical joint of claim 7, wherein the first apex, the second apex, the third apex, and the fourth apex are disposed about the centroid of the housing.

11. The electromechanical joint of claim 1, wherein the conductive fluid comprises Galinstan.

12. The electromechanical joint of claim 1, further comprising:
    a first yoke connected to the first conductive shaft exterior to the housing, the first yoke being configured to pivot about the first longitudinal axis upon rotation of the first conductive shaft about the first longitudinal axis.

13. The electromechanical joint of claim 12, further comprising:
    a second yoke connected to the second conductive shaft exterior to the housing, the second yoke being configured to pivot about the second longitudinal axis upon rotation of the second conductive shaft about the second conductive axis.

14. A work machine, comprising:
    an electric engine;
    traction devices configured to cause movement of the work machine along a haul route when powered by the electric engine;
    a current collector configured to movably engage with at least one power rail disposed proximate the haul route;
    at least one conductive arm having an upper end and a lower end; and
    an electromechanical joint disposed between the current collector and the at least one conductive arm, the electromechanical joint comprising:
        an enclosure;
        a first axle comprising a first shaft and a second shaft, the first shaft and the second shaft aligned longitudinally on a first axis passing through the enclosure;
        a second axle comprising a third shaft and a fourth shaft, the third shaft and the fourth shaft aligned longitudinally on a second axis passing through the enclosure substantially orthogonal to the first axis, wherein the first shaft, the second shaft, the third shaft, and the fourth shaft are spaced apart from each other by a separation; and a conductive fluid within the separation contacting the first axle and the second axle.

15. The work machine of claim 14, further comprising a first yoke, attached to the current collector, rotationally coupled to the first shaft and to the second shaft.

16. The work machine of claim 15, further comprising a second yoke, attached to the at least one conductive arm, rotationally coupled to the third shaft and to the fourth shaft.

17. The work machine of claim 14, further comprising a rotational joint connected to the upper end of the at least conductive arm, the rotational joint enabling rotation of the at least one conductive arm about a third axis substantially perpendicular to the first axis and to the second axis.

18. A method, comprising:
coupling an electrically conductive assembly to a source of electrical power, the electrically conductive assembly comprising an electromechanical joint between a first conductive yoke and a second conductive yoke, the electromechanical joint comprising:
a first conductive shaft coupled to the first conductive yoke and extending along a first longitudinal axis,
a second conductive shaft coupled to the second conductive yoke and extending along a second longitudinal axis different from the first longitudinal axis, the second conductive shaft being separated from the first conductive shaft, and
conductive fluid between the first conductive shaft and the second conductive shaft;

conducting the electrical power through the first conductive shaft, the conductive fluid, and the second conductive shaft;

in response to a first force on the second conductive yoke substantially perpendicular to the first longitudinal axis, pivoting the second conductive shaft about the first longitudinal axis;

in response to a second force on the second conductive yoke substantially perpendicular to the second longitudinal axis, rotating the second conductive shaft about the second longitudinal axis; and continuing to conduct the electrical power through the first conductive shaft, the conductive fluid, and the second conductive shaft during the one or more of the pivoting the second conductive shaft and the rotating the second conductive shaft.

19. The method of claim 18, the second conductive yoke shaft being aligned along a third longitudinal axis substantially perpendicular to the first longitudinal axis and the second longitudinal axis, further comprising:

in response to a third force on the second conductive yoke angularly with respect to the third longitudinal axis, rotating the second conductive shaft about the third longitudinal axis.

20. The method of claim 18, further comprising causing movement of a work machine to generate the first force and the second force.

* * * * *